United States Patent
Seltzer et al.

(10) Patent No.: US 7,707,029 B2
(45) Date of Patent: *Apr. 27, 2010

(54) TRAINING WIDEBAND ACOUSTIC MODELS IN THE CEPSTRAL DOMAIN USING MIXED-BANDWIDTH TRAINING DATA FOR SPEECH RECOGNITION

(75) Inventors: Michael L. Seltzer, Seattle, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1190 days.

This patent is subject to a terminal disclaimer.

(21) Appl. No.: 11/287,584

(22) Filed: Nov. 23, 2005

(65) Prior Publication Data

US 2006/0178871 A1    Aug. 10, 2006

Related U.S. Application Data

(63) Continuation-in-part of application No. 11/053,151, filed on Feb. 8, 2005, now Pat. No. 7,454,338.

(51) Int. Cl.
G10L 19/14    (2006.01)
(52) U.S. Cl. .................................................... 704/206
(58) Field of Classification Search ................ 704/205
See application file for complete search history.

(56) References Cited

U.S. PATENT DOCUMENTS

| 6,456,697 | B1 * | 9/2002 | Chang et al. ............. 379/88.01 |
| 6,917,918 | B2 | 7/2005 | Rockenbeck et al. ........ 704/244 |
| 7,016,838 | B2 | 3/2006 | Rockenbeck et al. ........ 704/244 |
| 7,181,390 | B2 * | 2/2007 | Droppo et al. ............. 704/226 |
| 7,197,456 | B2 * | 3/2007 | Haverinen et al. .......... 704/233 |
| 7,454,338 | B2 * | 11/2008 | Seltzer et al. ............... 704/243 |

OTHER PUBLICATIONS

N. Morgan et al., "Meetings about meetings: research at ICSI on Speech in Muliparty Conversations," in Proc. ICASSP, Hong Kong, Apr. 2003, vol. 4, pp. 740-743.
J.S. Garofolo et al., "The Rich Transcription 2004 Spring Meeting Recognition Evaluation," In Proc. NIST RT04 Meeting Recognition Workshop, Montreal, Canada 2004.
P. Moreno et al., "Sources of Degradation of Speech Recognition in the Telephone Network," in Proc. ICASSP, Adelaide, Australia, Apr. 1994, vol. I, pp. 109-112.
Z. Ghahramani et al., "Supervised Learning From Incomplete Data via an EM Approach," in Advances in Neural Information Processing Systems, 1994.
B. Raj et al., "Reconstruction of Damaged Spectrographic Features for Robust Speech Recognition," In Proc. ICSLP, Beijing, China, Oct. 2000.
M. Cooke, et al., "Robust Automatic Speech Recognition With Missing and Unreliable Acoustic Data," Speech Communication, vol. 34, No. 3, pp. 267-285, Jun. 2001.
M. L. Seltzer et al., "Classifier-Based Mask Estimation For Missing Feature Methods of Robust Speech Recognition," in Proc. ICSLP, Beijing, China 2000.

(Continued)

*Primary Examiner*—Susan McFadden
(74) *Attorney, Agent, or Firm*—Theodore M. Magee; Westman, Champlin, & Kelly, P.A.

(57) ABSTRACT

A method and apparatus are provided that use narrowband data and wideband data to train a wideband acoustic model.

8 Claims, 7 Drawing Sheets

OTHER PUBLICATIONS

L. G. Neumeyer et al., "Training Issues and Channel Equalization Techniques for the Construction of Telephone Acoustic Models Using a High-Quality Speech Corpus," IEEE Trans. Speech Audio Processing, vol. 2, No. 4, pp. 590-597, Oct. 1994.

Y.M. Cheng et al., "Statistical Recovery of Wideband Speech from Narrowband Speech," IEEE Trans. Speech Audio Processing, vol. 2, No. 4, pp. 544-548, Oct. 1994.

K.-Y. Park et al., "Narrowband to Wideband Conversion of Speech Using GMM Based Transformation," in Proc. ICASSP, Istanbul, Turkey, Jun. 2000, vol. 3, pp. 1843-1846.

P. Jax et al., "Wideband extension of telephone speech using a hidden Markov model," in IEEE Workshop on Speech Coding, Delavan, Wisconsin, Sep. 2000, pp. 133-135.

L.R. Rabiner, "A Tutorial on Hidden Markov Models and Selected Applications In Speech Recognition," Proc. IEEE, vol. 77, No. 2, pp. 257-286, Feb. 1990.

J.-L. Gauvain et al., "Maximum a Posteriori Estimation for Multivariate Gaussian Mixture Observations of Markov Chains," IEEE Trans. Speech Audio Processing, vol. 2, No. 2, pp. 291-298, Apr. 1994.

K.-F. Lee et al., "Speaker-independent phone recognition using Hidden Markov Models," IEEE Trans. Acoust., Speech, Signal Processing, vol. 37, No. 11, pp. 1641-1648, Nov. 1989.

S. Young, "The HTK Hidden Markov Model Toolkit: Design and Philosophy," Tech. Rep., Cambridge University, 1994.

B.J. Frey et al., "Algonquin: Iterating Laplace's Method to Remove Multiple Types of Acoustic Distortion for Robust Speech Recognition," In Proc. Eurospeech, Aalborg, Denmark, Sep. 2001.

J.A. Bilmes, "A Gentle Tutorial of the EM Algorithm and Its Applications to Parameter Estimation for Gussian Mixture and Hidden Markov Models," Tech. Rep. TR-97-021, U.C. Berkeley, Berkeley, CA, Apr. 1998.

N. Enbom et al., "Bandwidth Expansion of Speech Based on Vector Quantization of the Mel Frequency Cepstral Coefficients," IEEE Workshop on Speech Coding, 1999.

S. Chennoukh et al., "Speech Enhancement Via Frequency Bandwidth Extension Using Line Spectral Frequencies," ICASSP, 2001.

P. Jax et al., "Artificial Bandwidth Extension of Speech Signals Using MMSE Estimation Based on a Hidden Markov Model," ICASSP, 2003.

Y. Qian et al., "Combining Equalization and Estimation for Bandwidth Extension of Narrowband Speech," ICASSP, 2004.

P.J. Moreno et al., "A Vector Taylor Series Approach to Environment-Independent Speech Recognition," ICASSP, 1996.

J. Droppo et al., "A Comparison of Three Non-Linear Observation Models for Noisy Speech Features," Eurospeech, 2003.

A.P. Dempster et al., "Maximum Likelihood from Incomplete Data Via the EM Algorithms," Journal of Royal Statistical Society, vol. 39, No. 1, pp. 1-38, 1977.

\* cited by examiner

TRAINING WIDEBAND ACOUSTIC MODELS IN THE CEPSTRAL DOMAIN USING MIXED-BANDWIDTH TRAINING DATA FOR SPEECH RECOGNITION

REFERENCE TO RELATED APPLICATIONS

The present application is a Continuation-In-Part of U.S. patent application Ser. No. 11/053,151 filed on Feb. 8, 2005 now U.S. Pat. No. 7,454,338 and claims 1-14 and 19-20 of the present application are supported by U.S. patent application Ser. No. 11/053 151.

BACKGROUND

The present invention relates to speech recognition. In particular, the present invention relates to training acoustic models for speech recognition.

In speech recognition, speech signals are compared to acoustic models to identify a sequence of phonemes that is represented by the speech signal. In most such systems, the comparison between the speech signal and the models is performed in what is known as the cepstral domain. To place a speech signal in the cepstral domain, the speech signal is sampled by an analog-to-digital converter to form frames of digital values. A Discrete Fourier Transform is applied to the frames of digital values to place them in the frequency domain. The power spectrum is computed from the frequency domain values by taking the magnitude squared of the spectrum. Mel weighting is applied to the power spectrum and the logarithm of each of the weighted frequency components is determined. A truncated discrete cosine transform is then applied to form a cepstral vector for each frame. The truncated discrete cosine transform typically converts a forty dimension vector that is present after the log function into a thirteen dimension cepstral vector.

In order for speech decoding to be performed in the cepstral domain, the models must be trained on cepstral vectors. One way to obtain such training data is to convert speech signals into cepstral vectors using a high sampling rate such as sixteen kilohertz. When speech is sampled at this high sampling rate, it is considered wideband data. This wideband data is desirable because it includes information for a large number of frequency components thereby providing more information for forming models that can discriminate between different phonetic sounds.

Although such wideband speech data is desirable, it is expensive to obtain. In particular, it requires that a speaker be in the same room as the microphone used to collect the speech data. In other words, the speech cannot pass through a narrowband filter before reaching the microphone. This requirement forces either the speaker or the designer of the speech recognition system to travel in order to collect training speech.

A second technique for collecting training speech is to collect the speech through a telephone network. In such systems, people are invited to call into a telephone number and provide examples of speech.

In order to limit the amount of data passed through the telephone network, it is common for telephone network providers to sample the speech signal at a low sampling rate. As a result, the speech received for training is narrowband speech that is missing some of the frequency components that are present in wideband training speech. Because such speech includes less information than wideband speech, the models trained from such narrowband telephone speech do not perform as well as models trained from wideband speech.

Although systems have been developed that attempt to decode speech from less than perfect data, such systems have operated in the spectral domain and have not provided a way to train models from less than perfect data. Because the Discrete Cosine Transform that places vectors in the cepstral domain mixes frequency components, and often involves a truncation of features, such systems cannot be applied directly to training cepstral domain acoustic models.

The discussion above is merely provided for general background information and is not intended to be used as an aid in determining the scope of the claimed subject matter.

SUMMARY

A method and apparatus are provided that use narrowband data and wideband data to train a wideband acoustic model This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
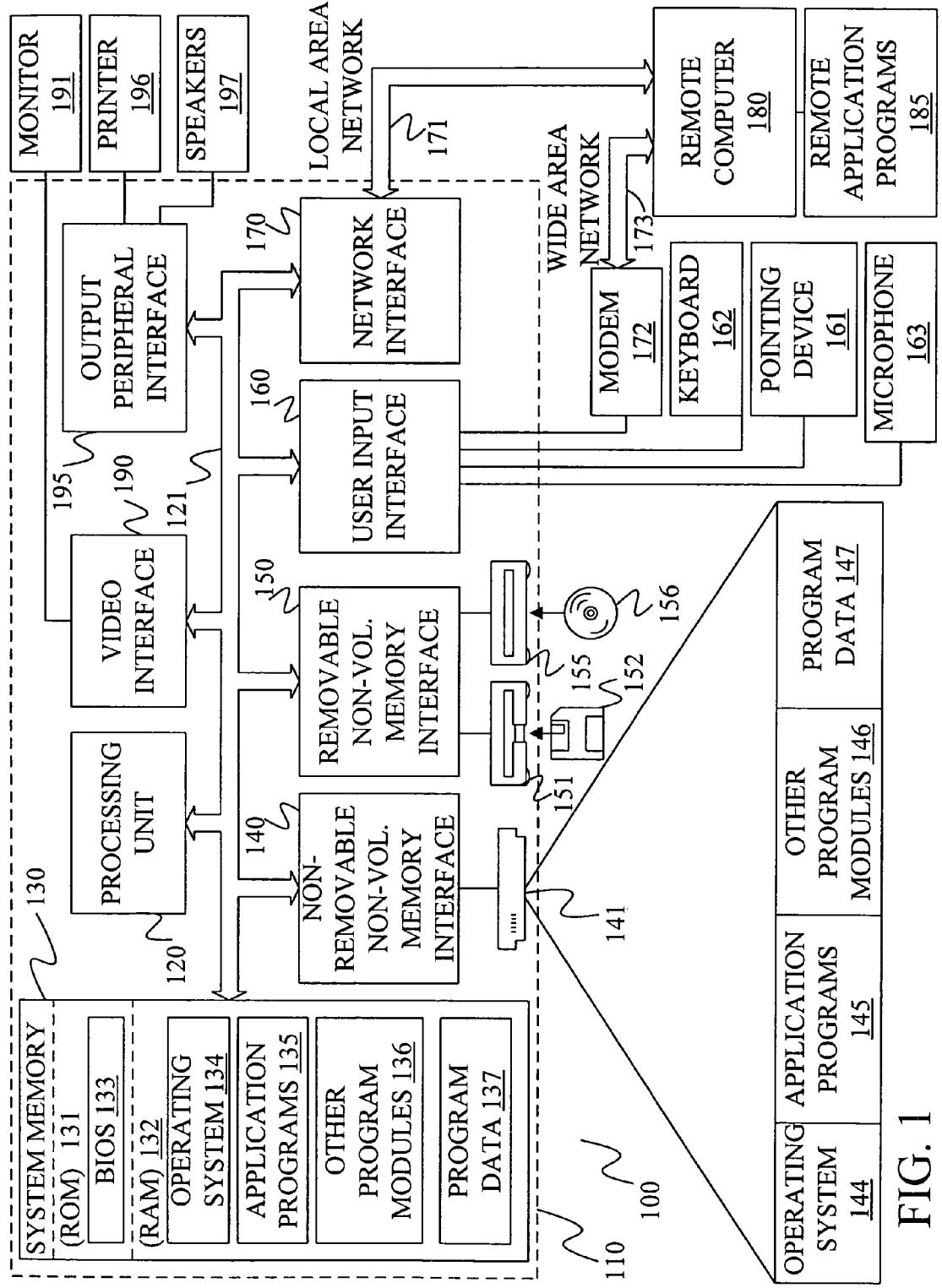
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
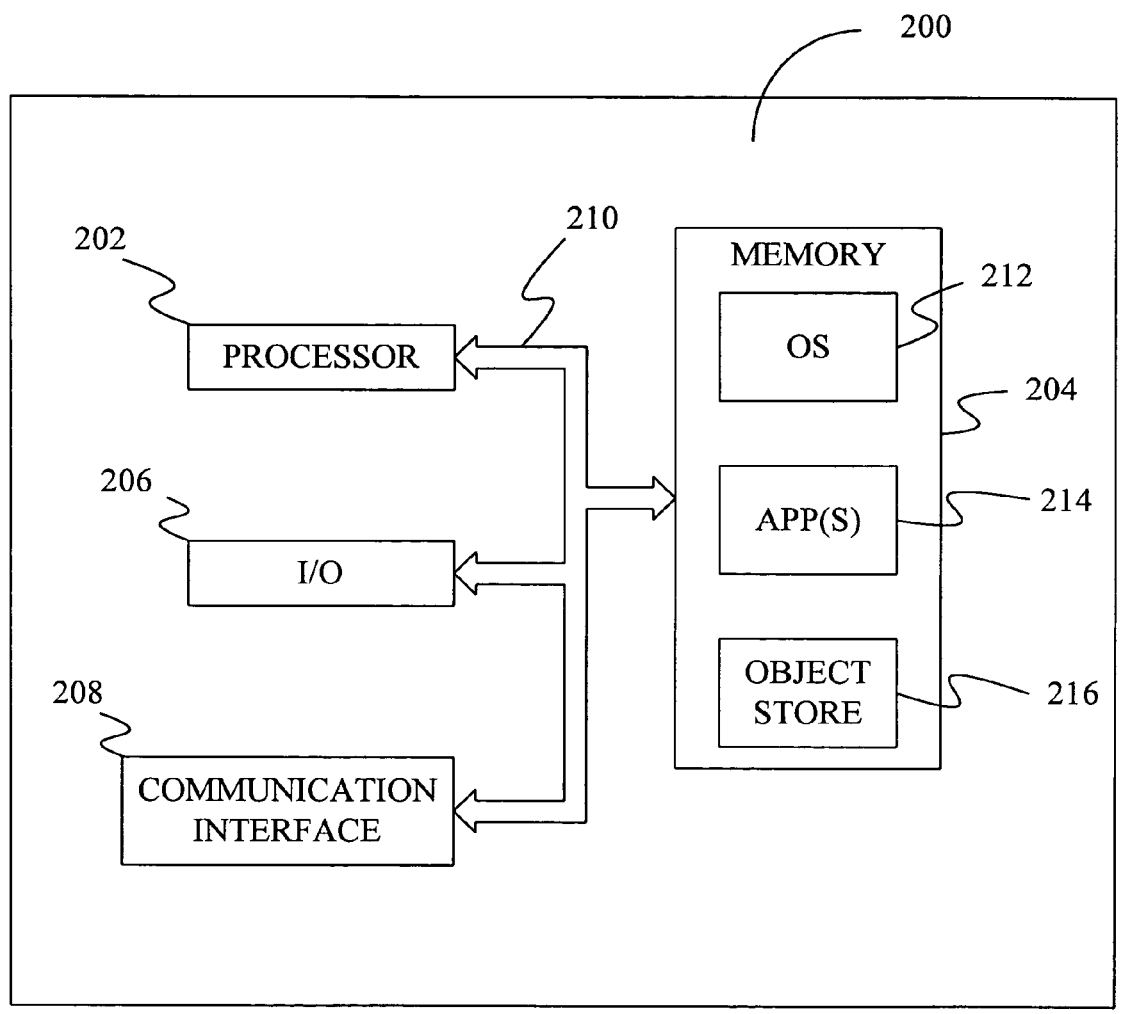
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

The present invention provides a technique for training wideband acoustic models in the cepstral domain using a mixture of wideband speech data and narrowband speech data. Under one embodiment, an iterative algorithm is used in which all of the model parameters in the cepstral domain are converted into the spectral domain during each iteration. In the spectral domain, estimates of components missing from the narrowband data are used to update the spectral domain model parameters. The spectral domain model parameters are then converted back into the cepstral domain. In other embodiments, the narrowband data is extended by estimating values for missing components in the narrowband data from models generated from wideband data. After the narrowband feature vectors have been extended, they are used to train the acoustic model in the cepstral domain.

The present invention provides a technique for training wideband acoustic models in the cepstral domain using a mixture of wideband speech data and narrowband speech data. Under one embodiment, an iterative algorithm is used in which all of the model parameters in the cepstral domain are converted into the spectral domain during each iteration. In the spectral domain, estimates of components missing from the narrowband data are used to update the spectral domain model parameters. The spectral domain model parameters are then converted back into the cepstral domain. In other embodiments, the narrowband data is extended by estimating values for missing components in the narrowband data from models generated from wideband data. After the narrowband feature vectors have been extended, they are used to train the acoustic model in the cepstral domain.

Figure 3:
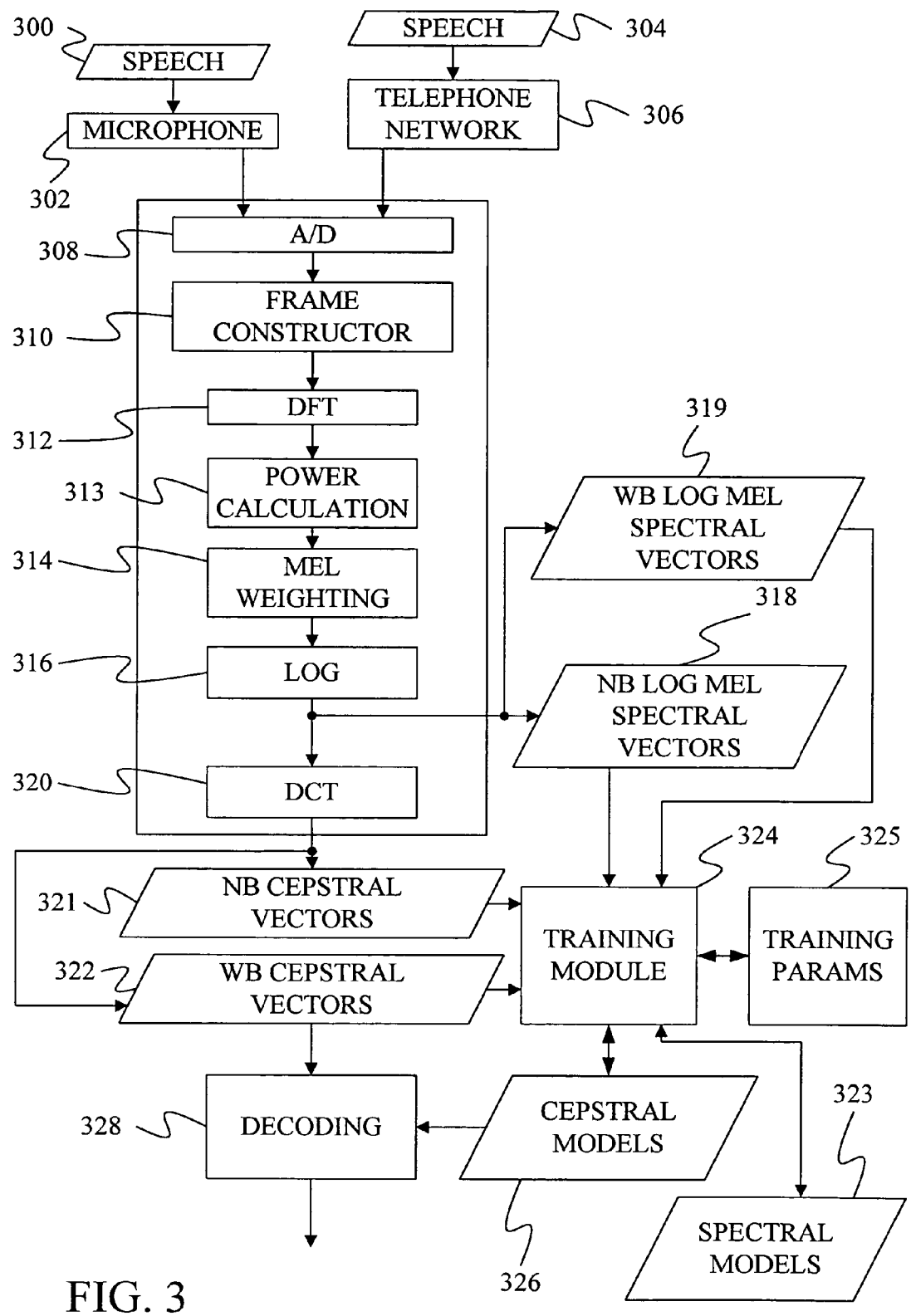
FIG. 3 is a block diagram of speech recognition training and decoding system of the present invention.

FIG. 3 provides a block diagram of a training and decoding system of the present invention. In FIG. 3, there are two sources of training speech data. Specifically, wideband speech data is provided when a speech signal 300 is detected by a microphone 302. Narrowband speech data is provided when a speech signal 304 passes through a telephone network 306, or some other filtering channel. The output of telephone network 306 may either be an analog signal or a digital signal.

The analog signal provided by microphone 302 or telephone network 306 is sampled by analog-to-digital converter 308, which in one embodiment samples at 16 kilohertz. If the telephone network 306 provides digital samples, the signal from the telephone network is not applied to analog-to-digital converter 308. Instead, the digital signal is "up-sampled" to provide samples at the same rate as those provided by analog-to-digital converter 308.

The digital samples are provided to a frame construction unit 310, which groups the digital samples into frames. Typically, the frame is "windowed" by multiplying the frame's samples by a windowing function. Typically, a Hamming window is used. The frames of digital samples are provided to a Discrete Fourier Transform (DFT) 312, which transforms the frames of time-domain samples into frames of frequency-domain samples.

The magnitudes of the frequency-domain values from DFT 312 are squared by a power calculation 313 to form a power spectrum, which is weighted by mel scale weighting 314. The logarithm of each weighted component is then computed by logarithm 316. The output of log 316 is a set of narrowband log spectral vectors 318 formed from the narrowband speech data and a set of wideband log spectral vectors 319 formed from wideband speech data, with one vector per frame.

The wideband spectral vectors 319 and the narrowband spectral vectors 318 are converted into wideband cepstral vectors 322 and narrowband cepstral vectors 321, respectively, by a Discrete Cosine Transform 320. Discrete Cosine Transform 320 is a truncated transform in which the dimensionality of each cepstral vector is less than the dimensionality of the spectral vector applied to the transform.

As noted in the background, narrowband speech data is missing certain frequency components because telephone network 306 samples the speech data at a low sampling rate and attenuates the low frequencies, those less than 300 Hz. These missing components are readily identifiable in the spectral domain since the narrowband spectral vectors will have rather small values for certain frequency components for which the wideband speech data has significant values. Under the present invention, these missing components are treated as missing variables and are estimated through an Expectation-Maximization algorithm. This estimation is performed in the spectral domain because in the cepstral domain, the observed components of the frequency spectrum and the missing components of the frequency spectrum are combined together and cannot be separated in order to form an estimate of the missing components.

Although the estimates of the missing components are formed in the spectral domain, the models that are trained must be trained in the cepstral domain in order to make them useful for speech recognition. Under one embodiment, the models comprise a mixture of Gaussians with mean and covariance parameters $vv_k$ and $\Phi_k$, respectively, and prior probability p(k) where k is the index of the mixture component. Thus, the probability of a cepstral vector z given a mixture component k is defined as:

$$p(z|k) = N(z; \mu_k, \Phi_k) = N(Cx; v_k, \Phi_k) \qquad \text{EQ. 1}$$

where in the right-hand side of the equation, the cepstral vector z has been replaced by Cx which represents the log spectral vector x applied to discrete cosine transform matrix C.

In order to iteratively train the model parameters for the cepstral domain, while estimating the missing components from the narrowband data in the spectral domain 318, the cepstral domain model parameters 326 must be converted to log mel spectra model parameters 323 during each iteration of training. If the cepstral vectors have the same dimensionality as the log spectral vectors (and thus the discrete cosine transform matrix is a square matrix), the conversion between the cepstral model parameters 326 and the log mel spectral model parameters 323 can be performed trivially via an inverse discrete cosine transform. However, because most speech recognition systems perform dimensionality reduction when converting from log mel spectral to cepstral, the discrete cosine transform matrix is not square. As a result, the log mel spectral covariance matrices obtain from cepstral covariance matrices via an inverse discrete cosine transform are rank deficient. Specifically, if the discrete cosine transform matrix is M×L with M<L, than the log mel spectral covariance matrix $\Sigma = C^{-1}\Phi C^{-T}$ is an L×L matrix with at most rank M. This is problematic because the covariance matrix must be full rank in order for it to be invertible and have a non-zero determinant.

One possible solution is to simply train an L-dimensional cepstral model using a square cosine transform, and then truncate the model parameters to M dimensions after training is complete. However this is sub-optimal, as the best way to maximize the overall likelihood may be optimize the higher dimensions of the model, which will be discarded at the expense of the lower dimensions, which are the ones of interest.

The present invention provides a solution that ensures that the log mel spectral covariance matrix is full rank but also ensures that the higher dimensions in the cepstral domain do not bias the posterior probability calculations in the iterative algorithm used to train the model. Specifically, to avoid biasing the posterior probability calculations, the present invention sets the model parameters for the cepstral dimensions that will not form part of the final model to be equal for all of the mixture components. By doing this, each of these dimensions will contribute equally to the likelihood of each mixture component and thus not alter the posterior probabilities.

To achieve this, the present invention uses a square discrete cosine transform matrix. This results in an inverse discrete cosine transform matrix that can be divided into a set of M columns and a set of R columns. Thus, for an inverse discrete cosine transform matrix $C^{-1}$ the following is defined:

$$\mu_k = C^{-1} v_k \qquad \text{EQ. 2}$$

$$\mu_k = [C_M^{-1} C_R^{-1}] \begin{bmatrix} v_{k,M} \\ v_{k,R} \end{bmatrix} \qquad \text{EQ. 3}$$

$$\mu_k = C_M^{-1} v_{k,M} + C_R^{-1} v_{k,R} \qquad \text{EQ. 4}$$

where $v_k$ is the cepstral mean vector having L dimensions, $\mu_k$ is the mel spectral mean vector having L dimensions, $v_{k,M}$ are the first M dimensions of the cepstral mean vector, $v_{k,R}$ are the last R dimensions of the cepstral mean vector, $C_M^{-1}$ the first M columns of the inverse discrete cosine transform matrix, and $C_R^{-1}$ are the last R columns of the inverse discrete cosine transform matrix.

Similarly, the log mel spectral covariance matrix can be defined as:

$$\Sigma_k = C^{-1} \Phi_k C^{-T} \qquad \text{EQ. 5}$$

$$\Sigma_k = [C_M^{-1} C_R^{-1}] \begin{bmatrix} \Phi_{k,M} & 0^T \\ 0 & \Phi_{k,R} \end{bmatrix} \begin{bmatrix} C_M^{-T} \\ C_R^{-T} \end{bmatrix} \qquad \text{EQ. 6}$$

$$\Sigma_k = C_M^{-1} \Phi_{k,M} C_M^{-T} + C_R^{-1} \Phi_{k,R} C_R^{-T} \qquad \text{EQ. 7}$$

where 0 is an R×M 0 matrix, $\Phi_{k,M}$ and $\Phi_{k,R}$ are assumed to be diagonal, although not required, $C_M^{-T}$ and $C_R^{-T}$ are the transpose of the inverse discrete cosine transform matrices $C_M^{-1}$ and $C_R^{-1}$.

Equations 4 and 7 show that the log mel spectral mean vector $\mu_k$ and covariance matrix $\Sigma_k$ can be decomposed into the sum of two terms, the first reflecting the contribution of the first M dimensions of the cepstral vector and the second reflecting the contribution of the last R dimensions of the cepstral vector. In order to ensure that any differences in the posterior probabilities of the various mixture components are due only to the first M cepstral coefficients, and yet ensure that $\Sigma_k$ is full rank, the second additive term is set to be identical for all mixture components. Thus, equations 4 and 7 become:

$$\mu_k = C_M^- v_k + b_G \qquad \text{EQ. 8}$$

$$\Sigma_k = C_M^{-1} \Phi_k C_M^{-T} + A_G \qquad \text{EQ. 9}$$

where $b_G$ and $A_G$ are the same for each mixture component.

Figure 4:
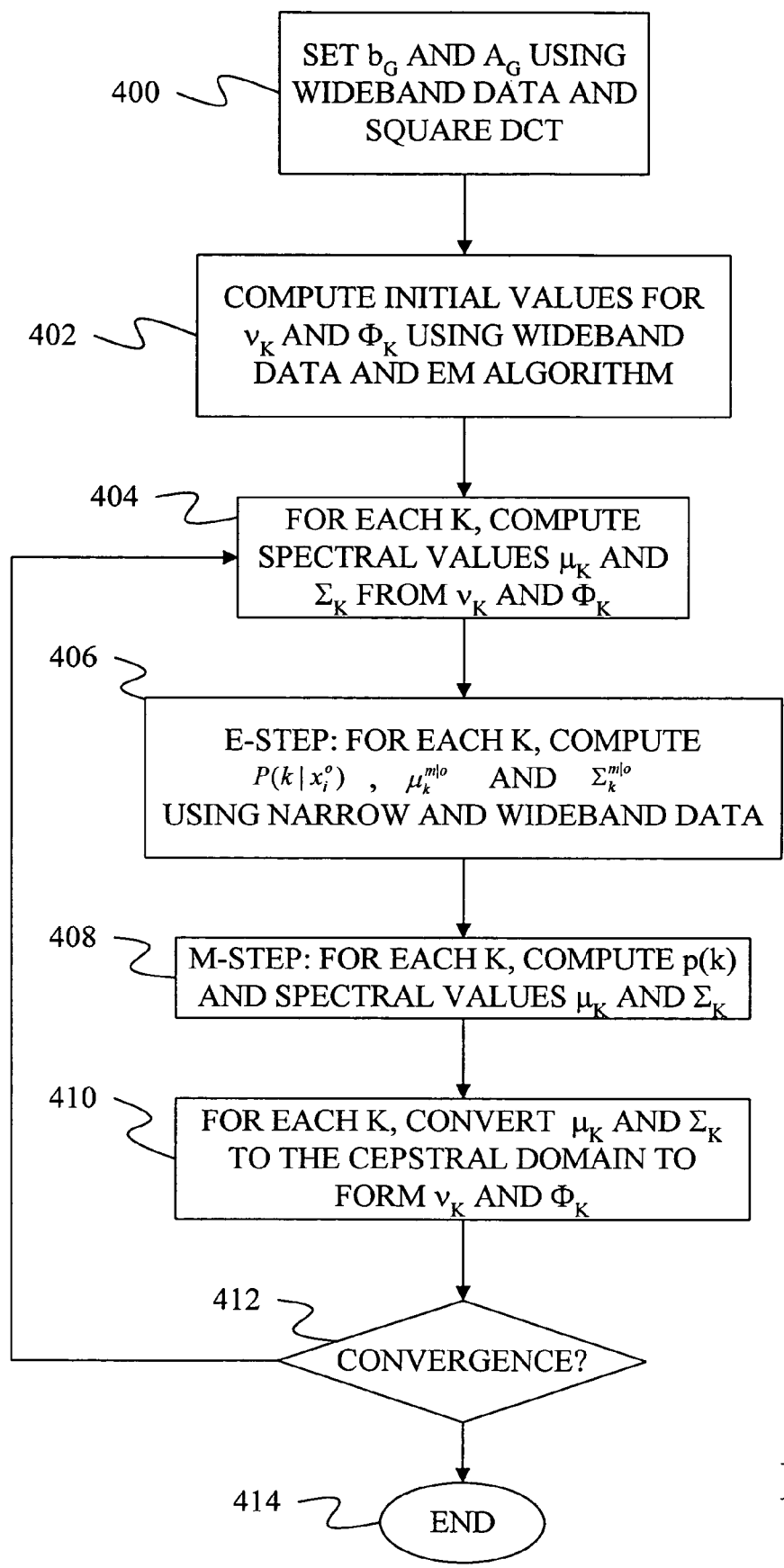
FIG. 4 is a flow diagram of a method for training a speech recognition system using mixed-bandwidth data.

FIG. 4 provides a flow diagram of a method of training cepstral model values 326 using the inverse discrete cosine transform described above. In step 400 of FIG. 4, the values for $b_G$ and $A_G$ are determined using wideband data. Specifically, wideband spectral data 319 produced by log function 316 are applied to a square discrete cosine transform to produce a set of extended cepstral vectors. The last R dimensions of the cepstral vectors are used to determine a mean cepstral vector for the last R dimensions, $v_{G,R}$, and a covariance matrix for the last R dimensions, $\Phi_{G,R}$. Note that the mean vector and the covariance matrix are global values that are determined across all of the mixture components. The values for $b_G$ and $A_G$ are then calculated as:

$$b_G = C_R^{-1} v_{G,R} \qquad \text{EQ. 10}$$

$$A_G = C_R^{-\Phi}{}_{G,R} C_R^{-T} \qquad \text{EQ. 11}$$

These values are stored as training parameters 325 of FIG. 3.

At step 402, initial values for the cepstral model parameters for each mixture component are determined. Specifically, the cepstral mean vector $v_k$ and cepstral covariance matrix $\Phi_k$ is determined for each mixture component from the wideband cepstral data 322 alone using an EM algorithm. During the EM algorithm, the prior probability, mean and covariance are updated during each iteration as:

$$p(k) = \frac{1}{N} \sum_{i=1}^{N} p(k \mid z_i) \quad \text{EQ. 12}$$

$$v_k = \frac{\sum_{i=1}^{N} p(k \mid z_i) z_i}{\sum_{i=1}^{N} p(k \mid z_i)} \quad \text{EQ. 13}$$

$$\Phi_k = \frac{\sum_{i=1}^{N} p(k \mid z_i)(z_i - \hat{v}_k)(z_i - \hat{v}_k)^T}{\sum_{i=1}^{N} p(z \mid x_i)} \quad \text{EQ. 14}$$

where N is the number of frames in the wideband training data 322, $p(k|z_i)$ is the probability of mixture component k given cepstral feature vector $z_i$ which is computed during the E step of the EM algorithm, and $\hat{v}_k$ is the mean determined during the last or current iteration of the EM algorithm.

After the cepstral model parameters 326 have been initialized at step 402, they are converted into spectral domain model parameters 323 using equations 8 and 9 above at step 404. This creates log mel spectral mean $\mu_k$ and covariance matrix $\Sigma_k$.

Under the present invention, the model parameters are updated in the spectral domain using a combination of wideband spectral data 319 and narrowband spectral data 318. The wideband spectral data 319 contains all of the frequency components found in the mean $\mu_k$ and covariance matrix $\Sigma_k$. However, the narrowband spectral data 318 does not include values for certain frequency components that are present in the wideband spectral data 319. The components that the narrowband spectral data 318 does possess are referred to as observed components and the frequency components that the narrowband spectral data 318 does not possess are referred to as missing components. Typically, the narrowband spectral data 318 is missing certain frequency components because the speech signal has passed through some type of filter or has been sampled at a low sampling rate. The filtering can be performed to reduce the bandwidth of data passed through a channel or to remove frequency components that are likely to be corrupted by noise.

The observed and missing frequency components can be used to divide the spectral mean vector and the covariance matrix into partitions such that:

$$\mu_k = [\mu_k^{o,T} \; \mu_k^{m,T}]^T \quad \text{EQ. 15}$$

$$\Sigma_k = \begin{bmatrix} \Sigma_k^{oo} & \Sigma_k^{mo} \\ \Sigma_k^{om} & \Sigma_k^{mm} \end{bmatrix} \quad \text{EQ. 16}$$

Using these partitions, the following values can be determined at step 406 during the E step of an EM algorithm:

$$\mu_{ik}^{m|o} = \mu_k^m + \sum^{mm} \sum^{ooo,-1} (x_i^o - \mu_k^o) \quad \text{EQ. 17}$$

$$\tilde{\Sigma}_k^{m|o} = \Sigma_k^{mm} - \sum_k^{mm} \sum_k^{mooo,-1om} \quad \text{EQ. 18}$$

$$p(k \mid x_i^o) = \frac{p(x_i^o \mid k) p(k)}{\sum_{k'=1}^{K} p(x_i^o \mid k') p(k')} \quad \text{EQ. 19}$$

where $x_i^o$ is a vector of the frequency components that are observed at time i in both the narrowband spectral data 318 and the wideband spectral data 319, $p(x_i^o|k)$ is a probability of the observed frequency components given mixture component k which is defined as a normal distribution with mean $\mu_k^o$ and covariance $\Sigma_k^{oo}$, $p(k)$ is the prior probability of a mixture component which initially is set to 1/K where K is the number of mixture components.

Note that in the computation of $p(k|x_i^o)$ of equation 19, more dimensions will be used for the wideband spectral data 319 than for the narrowband spectral data 318 since the wideband spectral data 319 includes more observed components.

In equation 17, only those components that are found in both the wideband spectral data 319 and the narrowband spectral data 318 are used in the difference calculation.

Once these values have been calculated at step 406, they are used in an M step of the EM algorithm, shown as step 408 in FIG. 4, to compute updated values for $\mu_k$, $\Sigma_k$ and $p(k)$. Specifically, the update equation for $\mu_k$ is:

$$\mu_k^{new} = \frac{\sum_{i=1}^{N} p(k \mid x_i^o) \tilde{x}_{ik}}{\sum_{i=1}^{N} p(k \mid x_i^o)} \quad \text{EQ. 20}$$

where:

$$\tilde{x}_{ik} = \begin{cases} x_i & \text{if frame } i \text{ is wideband} \\ \begin{bmatrix} x_i^o \\ \mu_{ik}^{m|o} \end{bmatrix} & \text{if frame } i \text{ is narrowband} \end{cases} \quad \text{EQ. 21}$$

with $\mu_{ik}^{m|o}$ computed from the current set of model parameters.

The update equation for the covariance matrix is:

$$\Sigma_k^{new} = \frac{\sum_{i=1}^{N} p(k \mid x_i^o)(\tilde{x}_{ik} - \mu_k)(\tilde{x}_{ik} - \mu_k)^T}{\sum_{i=1}^{N} p(k \mid x_i^o)} + \tilde{\Sigma}_k^{m|o} \quad \text{EQ. 22}$$

where:

$$\tilde{\Sigma}_k^{m|o} = \begin{bmatrix} 0^{oo} & 0^{om} \\ 0^{mo} & \tilde{\Sigma}_k^{m|o} \end{bmatrix} \quad \text{EQ. 23}$$

and the update equation for p(k) is:

$$p(k)^{new} = \frac{1}{N}\sum_{i=1}^{N} p(k \mid x_i^o) \quad \text{EQ. 24}$$

In equation 22, the state-dependent conditional covariance, $\Sigma_k^{m|o}$, is only added to the covariance assigned to the $\rho_k^{mm}$ partition of $\rho_k$, and reflects the uncertainty associated with the absence of the missing components in the narrowband training vectors.

An intuition for update equations 20-24 is that for wideband data, the mean will be updated based on the entire wideband feature vector. However, for narrowband data, only some of the dimensions of the mean are updated from the observed dimensions in the narrowband feature vector. For those dimensions that are not present in the narrowband feature vector, an approximation to those missing feature components is used to derive the update for the mean. This approximation is derived in equation 17 by adjusting the mean for the missing components from the previous iteration based on the difference between the observed component and the mean for the observed component as well as the covariance between the missing components and the observed components.

After the mean and covariance have been updated in the spectral domain, they are converted to the cepstral domain at step 410. This is done by applying the mean and covariance to a truncated discrete cosine transform as:

$$v \Leftarrow C_{trunc}\mu_k \quad \text{EQ. 25}$$

$$\Phi \Leftarrow C_{trunc}\Sigma_k C_{trunc}^T \quad \text{EQ. 26}$$

This produces a new cepstral mean vector and cepstral covariance for each mixture component k and is stored in cepstral models 326.

After the mean and covariance for each mixture component has been converted to the cepstral domain, the method of FIG. 4 determines if the model parameters have converged at step 412. If the model parameters have not converged, the process returns to step 404 and converts the current cepstral model parameters to the spectral domain using equations 8 and 9 above. Steps 406, 408, 410 and 412 are then repeated using the new spectral model parameters.

When the cepstral model parameters converge at step 412, the process ends at step 414. The cepstral model parameters 326 may then be used by decoding unit 328 to decode input cepstral vectors.

The process of training the cepstral model parameters shown in FIG. 4 allows parameters to be trained based on a combination of wideband data and narrowband data. As a result, the invention can be practiced with a small amount of wideband data and a large amount of inexpensive narrowband data. This reduces the cost of training speech recognition models in the cepstral domain. In addition, the technique for allowing an inversion of the cepstral model parameters to the spectral domain as found above allows the model parameters to be updated in the spectral domain where the observed components and the missing components from the narrowband data can be separated from each other. Such separation of the missing and observed frequency components would not be possible in the cepstral domain.

Figure 5:
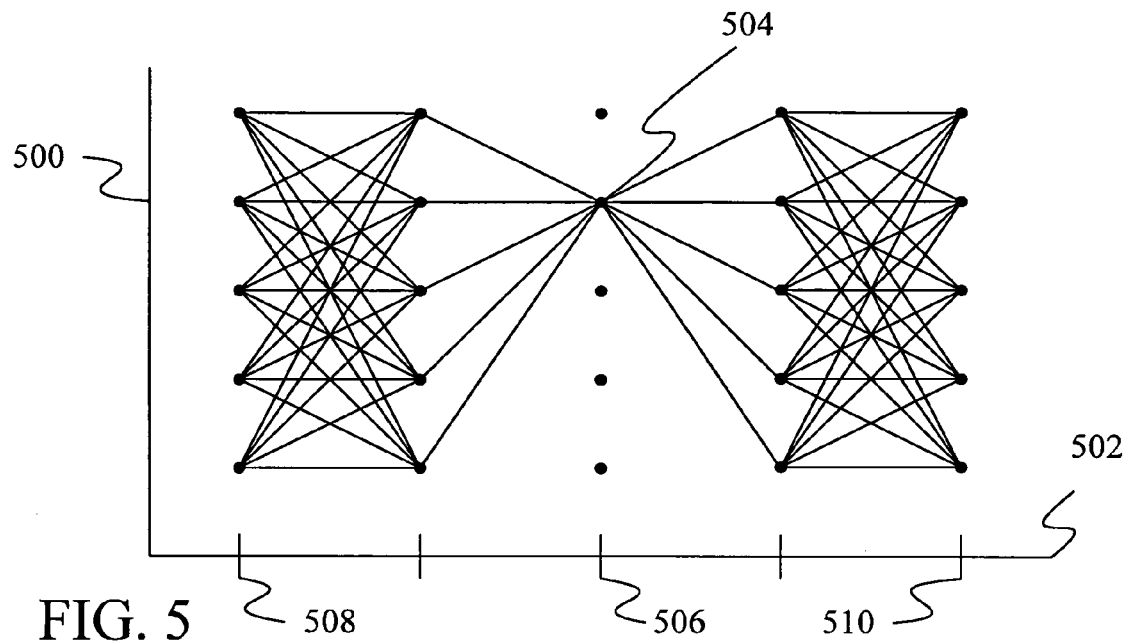
FIG. 5 is a graph showing HMM states over time.

The invention has been described above with reference to a Gaussian mixture model. This Gaussian mixture model could be extended to a Hidden Markov Model with K states, each state having a mixture of Q Gaussians associated with it. During HMM decoding, a sequence of HMM states is identified from an observation sequence $X^o=[x_0^o \ldots x_{n-1}^o]$. FIG. 5 shows a graph of HMM states over time with HMM states shown on vertical axis 500 and time shown on horizontal axis 502. At any state and time, the probability of a mixture component in that state is based on the probability of entering that state at that time from all possible state sequences that precede that state, the probability of leaving that state at that time through all possible state sequences after that state, and the probability of that mixture component in that state given the observed feature vector. For example, in FIG. 5, the probability of a mixture component of state 504 is based on all of the possible state sequences that enter state 504 at time 506, shown as lines connecting states from time point 508 to state 504, all of the possible state sequences that extend from state 504, shown as lines connecting state 504 to states at time point 510, and the probability of the mixture component given the observed feature vector. In terms of an equation, the posterior probability of the qth Gaussian in HMM state k for frame i, given an observation sequence of feature vectors is defined as:

$$\gamma_{ikq} = \frac{\alpha_{ik}\beta_{ik}}{\sum_{k'=1}^{K}\alpha_{ik'}\beta_{ik'}} \frac{p(x_i^o \mid k, q)p(k, q)}{\sum_{q'=1}^{Q} p(x_i^o \mid k, q')p(k, q')} \quad \text{EQ. 27}$$

where $\alpha_{ik}$ and $\beta_{ik}$ are the conventional forward and backward variables used in the Baum Welch training algorithm for HMM models, p(k,q) is the mixture weight of the qth Gaussian in state k, and $$p(x_i^o \mid k, q) = N\left(x_i^o; \mu_{kq}^o, \sum_{kq}^{oo}\right),$$

is the likelihood of the given Gaussian measured using the observed components only. Thus, the $\alpha_{ik}$ and $\beta_{ik}$ terms provide the probability of reaching state k from the beginning of the sequence of observed vectors until the current vector and reaching the last vector in the sequence of observed vectors from the current vector. The remaining terms provide the probability of the qth mixture component in state k given the current observation value. Using this posterior definition, equations 20, 22 and 24 become:

$$\mu_{qk}^{new} = \frac{\sum_{i=1}^{N}\gamma_{iqk}\tilde{x}_{iqk}}{\sum_{i=1}^{N}\gamma_{iqk}} \quad \text{EQ. 28}$$

$$\Sigma_{qk}^{new} = \frac{\sum_{i=1}^{N}\gamma_{iqk}(\tilde{x}_{iqk} - \mu_{qk})(\tilde{x}_{iqk} - \mu_{qk})^T}{\sum_{i=1}^{N}\gamma_{iqk}} + \tilde{\Sigma}_{qk}^{m|o} \quad \text{EQ. 29}$$

$$p(q, k)^{new} = \frac{1}{N}\sum_{i=1}^{N}\gamma_{iqk} \quad \text{EQ. 30}$$

where k and q are used to index the model parameters, with k representing the HMM state and q representing the mixture component of the state.

The Hidden Markov Model training described above is computationally expensive since it requires an update of the estimate of the missing components for each state at each frame of the input. Under a separate embodiment, a wideband cepstral vector $z_i$ is inferred given an observed narrowband log mel spectral vector $x_i^o$. This inferred wideband cepstral vector is then combined with measured wideband cepstral data to train acoustic models in the cepstral domain. Under one embodiment, the inference is performed using a minimum mean squared error estimate (MMSE) of a wideband cepstral vector $z_i$, which can be expressed as:

$$\hat{z}_i = E[z|x_i^o] = E[z_i^o + z^m|x_i^o] = C^o x_i^o + C^m E[x^m|x_i^o] \quad \text{EQ. 31}$$

where $E[.]$ represents the expectation operator, $C^o$ represents the elements of the discrete cosine transform matrix $C$ that are applied to the frequency components observed in the narrowband data, $C^m$ represents the portions of the discrete cosine transform that are applied to the frequency components that are missing in the narrowband data but that are present in the wideband data, $x^m$ represents the missing frequency components in the narrowband data and $x_i^o$ represents the observed frequency components in the narrowband feature vector.

The expected value of the missing frequency components given the observed frequency components, $E[x^m|x_i^o]$ can be determined from Gaussian mixture model parameters as:

$$E[x^m | x_i^o] = \sum_{k=1}^{K} \int x^m p(x^m, k | x_i^0) dx^m \quad \text{EQ. 32}$$

$$E[x^m | x_i^o] = \sum_{k=1}^{K} p(k | x_i^o) \int x^m p(x^m | x_i^0, k) dx^m \quad \text{EQ. 33}$$

$$E[x^m | x_i^o] = \sum_{k=1}^{K} p(k | x_i^o) \mu_{ik}^{m|o} \quad \text{EQ. 34}$$

where $p(k|x_i^o)$ is the posterior probability of the kth Gaussian based only on the observed components of the feature vector and $\mu_{ik}^{m|o}$ is the conditional mean defined in equation 17. Substituting equation 34 into equation 31 leads to the solution for the minimum mean squared error estimate of $z_i$ given the narrowband observation $x_i^o$:

$$\hat{z}_i = C^o x_i^o + C^m \left( \sum_{k=1}^{K} p(k | x_i^o) \mu_{ik}^{m|o} \right) \quad \text{EQ. 35}$$

Equation 35 describes the inference for a Gaussian Mixture Model. For a Hidden Markov Model, the summation is performed across all mixture components and all states. Thus, Equation 35 becomes:

$$\hat{z}_i = C^o x_i^o + C^m \left( \sum_{k=1}^{K} \sum_{q=1}^{Q} \gamma_{ikq} \mu_{ikq}^{m|o} \right) \quad \text{EQ. 36}$$

where $\gamma_{ikq}$ is defined in equation 26 above.

Figure 6:
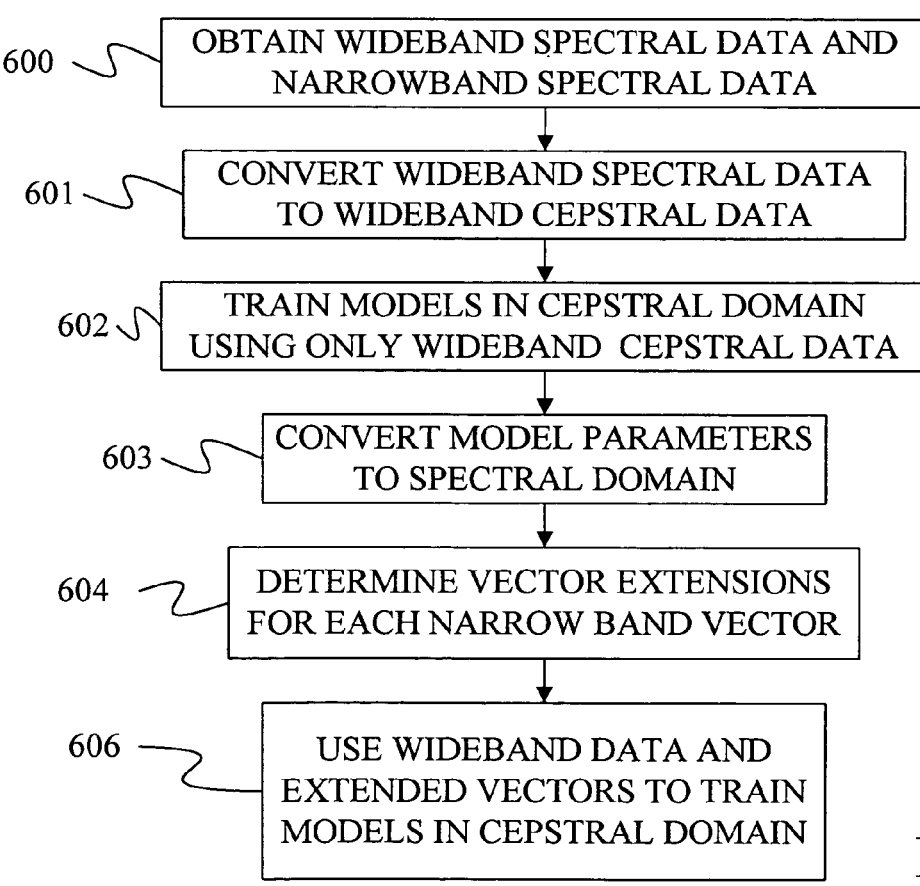
FIG. 6 is a flow diagram of a method of training acoustic models using bandwidth extended features.

FIG. 6 provides a flow diagram of a method in which equation 35 or 36 may be used to infer wideband cepstral vectors from narrowband cepstral data as part of training acoustic models in the cepstral domain. In step 600 of FIG. 6, an acoustic model is trained in the cepstral domain using only wideband data. Such training is described above with reference to equations 13 and 14, in which an EM algorithm is used to train a mean $v_k$ and a covariance $\Phi_k$ for each mixture component k.

In step 602, the cepstral domain model parameters are converted to the spectral domain using equations 8-11 described above. Using the model parameters in the spectral domain, the posterior probability and the conditional mean vector are determined for each Gaussian. For a Gaussian mixture model, this involves computing $p(k|x_i^o)$ and $\mu_{ik}^{m|o}$ using equations 19 and 17 described above. For a Hidden Markov Model, this involves computing $p(k,q|x_i^o)$ and $\mu_{iqk}^{m|o}$ using equations 19 and 17 above and indexing the Gaussian models by their state k and mixture component q. In equations 19, the probability of a mixture component $p(k)$ (or $p(q,k)$ for an HMM) can be determined during the training of the cepstral domain model parameters. Using the values of the posterior probability and the conditional mean, the vector extensions for the narrowband vector can be determined and the wideband data vector can be inferred using Equation 35 or Equation 36 at step 604.

After all of the narrowband data has been extended to form extended narrowband vectors, the extended narrowband vectors are combined with the wideband data vectors to train the acoustic models in the spectral domain at step 606.

Under one embodiment, the extended narrowband vectors are not as "trusted" as the wideband vectors since the extended narrowband vectors have their missing components estimated. To reflect this "mistrust," a weighting factor can be assigned to the posterior probability of each frame of bandwidth-extended speech when the Gaussian parameter updates are computed during the EM training of the models in the cepstral domain. Thus, for an HMM model the prior model, the mean and the variance are updated as:

$$p(k, q) = \frac{\sum_{i=1}^{N^w} \gamma_{ikq} + \lambda \sum_{j=1}^{N^b} \gamma_{jkq}}{N^w + N^b} \quad \text{EQ. 37}$$

$$v_{kq} = \frac{\sum_{i=1}^{N^w} \gamma_{ikq} z_i + \lambda \sum_{j=1}^{N^b} \gamma_{jkq} \hat{z}_j}{\sum_{i=1}^{N^w} \gamma_{ikq} + \lambda \sum_{j=1}^{N^b} \gamma_{jkq}} \quad \text{EQ. 38}$$

$$\Phi_{kq} = \frac{\sum_{i=1}^{N^w} \gamma_{ikq}(z_i - v_{kq})(z_i - v_{kq})^T + \lambda \sum_{j=1}^{N^b} \gamma_{jkq}(\hat{z}_j - v_{kq})(\hat{z}_j - v_{kq})^T}{\sum_{i=1}^{N^w} \gamma_{ikq} + \lambda \sum_{j=1}^{N^b} \gamma_{jkq}} \quad \text{EQ. 39}$$

where $\lambda$ is between zero and one, $z_i$ represents a wideband speech vector, $\hat{z}_j$ represents an extended narrowband feature vector $N^w$ represents the number of wideband feature vectors, $N^b$ represents the number of extended narrowband feature vectors and $\gamma_{ikq}$ and $\gamma_{jkq}$ are the state posterior probabilities computed from the E-step of the conventional Baum Welch algorithm and are defined as:

$$\gamma_{ikq} = \frac{\alpha_{ik} \beta_{ik}}{\sum_{k'=1}^{K} \alpha_{ik'} \beta_{ik'}} \frac{p(z_i | k, q) p(k, q)}{\sum_{q'=1}^{Q} p(z_i | k, q') p(k, q')} \quad \text{EQ. 40}$$

$$\gamma_{jkq} = \frac{\alpha_{jk} \beta_{jk}}{\sum_{k'=1}^{K} \alpha_{jk'} \beta_{jk'}} \frac{p(\hat{z}_j | k, q) p(k, q)}{\sum_{q'=1}^{Q} p(\hat{z}_j | k, q') p(k, q)} \quad \text{EQ. 41}$$

where $\alpha_{ik}$ and $\alpha_{jk}$ are the forward variables and $\beta_{ik}$ and $\beta_{jk}$ are and backward variables used in the Baum Welch training algorithm.

The value of $\lambda$ may be set by using a development set of data and testing different values of $\lambda$ to see which value gives the best acoustic models as tested against the development set. Under many embodiments, the present inventors have found that a value of $\lambda$ at 0.2 performs well.

In a further embodiment, the uncertainty about the extended narrowband vectors is captured by calculating a global cepstral posterior distribution for each narrowband vector $p(z|x_i^o)=N(z;\hat{z}_i,\Gamma_i)$ as:

$$\hat{z}_i=E[z|x_i^o]=E[z_i^o+z^m|x_i^o]=C^o x_i^o+C^m E[x^m|x_i^o] \quad \text{EQ. 42}$$

$$\Gamma_i=C^m(E[x^m x^{m,T}|x_i^o]-E[x^m|x_i^o]E[x^m|x_i^o]^T)C^{m,T} \quad \text{EQ. 43}$$

where $\hat{z}_i$ is the mean of the cepstral posterior distribution, $\Gamma_i$ is the covariance of the cepstral posterior distribution, which in one embodiment is assumed to be diagonal, E[.] represents the expectation operator, $C^o$ represents the elements of the discrete cosine transform matrix C that are applied to the frequency components observed in the narrowband data, $C^m$ represents the portions of the discrete cosine transform that are applied to the frequency components that are missing in the narrowband data but that are present in the wideband data, $C^{m,T}$ is the transpose of $C^m$, $x^m$ represents the missing frequency components in the narrowband data, $x^{m,T}$ is the transpose of $x^m$, and $x_i^o$ represents the observed frequency components in the narrowband feature vector.

The expected value of the missing frequency components given the observed frequency components, $E[x^m x^{m,T}|x_i^o]$, and the expected value of the square of the missing frequency components given the observed frequency components $E[x^m x^{m,T}|x_i^o]$, can be determined from Gaussian mixture model parameters as:

$$E[x^m | x_i^o] = \sum_{k=1}^{K} p(k | x_i^o) \mu_{ik}^{m|o} \quad \text{EQ. 44}$$

$$E[x^m x^{m,T} | x_i^o] = \sum_{k=1}^{K} p(k | x_i^o)(\Sigma_k^{m|o} + \mu_{ik}^{m|o}\mu_{ik}^{m|o,T}) \quad \text{EQ. 45}$$

where $p(k|x_i^o)$ is the posterior probability of the kth Gaussian based only on the observed components of the feature vector, $\mu_{ik}^{m|o}$ is the conditional mean defined in equation 17, and $\Sigma_k^{m|o}$ is the state-dependent conditional covariance defined in equation 18.

Comparing equations 42 and 43 to equation 31 above, it can be seen that the posterior distribution embodiment described by equations 42 and 43 is similar to the narrowband vector extension embodiment of equation 31 in that the extended narrowband vector formed in equation 31 is simply the mean of the cepstral posterior distribution.

Figure 7:
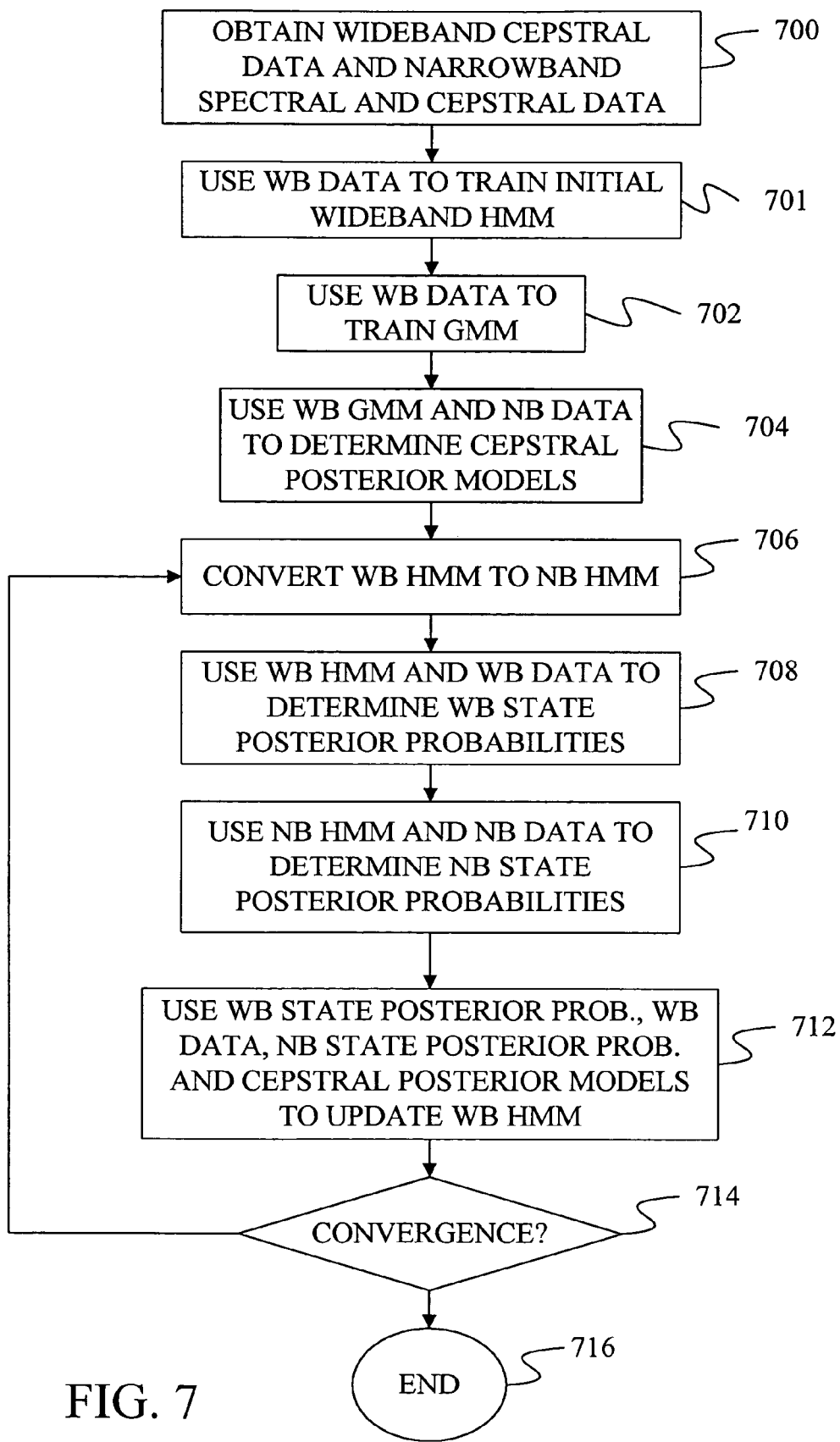
FIG. 7 is a flow diagram of a method of training HMM models using cepstral posterior distributions.
Figure 8:
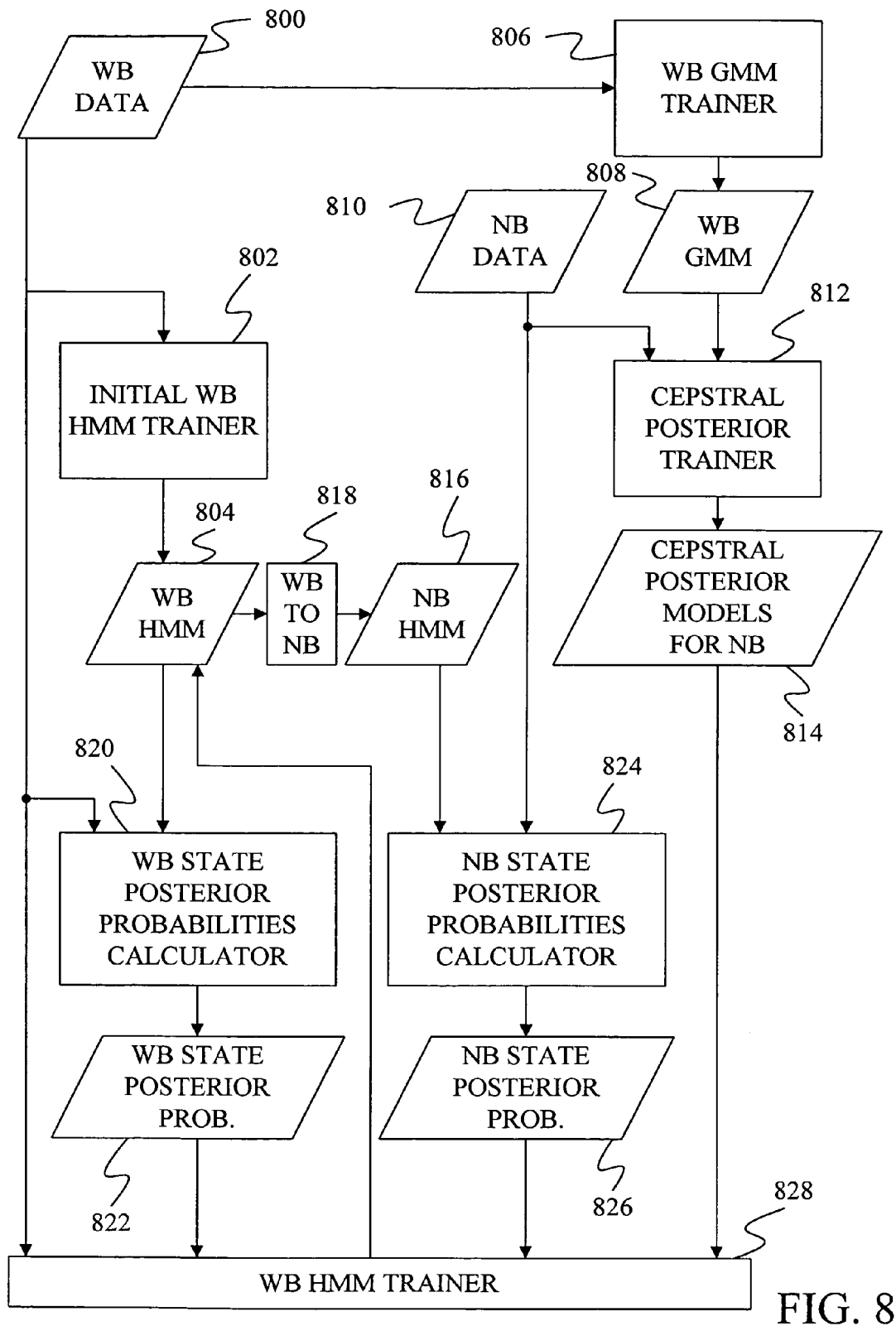
FIG. 8 is a block diagram of elements used in the method of FIG. 7.

FIG. 7 provides a flow diagram of a method in which equations 42 and 43 may be used to train an acoustic model in the cepstral domain. In particular, the embodiment of FIG. 7 provides a method for training a wideband HMM. FIG. 8 provides a block diagram of elements used in the flow diagram of FIG. 7.

In step 700 of FIG. 7, wideband cepstral data 800 and narrowband spectral and cepstral data 810 are obtained from speech signals. The narrowband cepstral data is formed from the narrowband spectral data.

At step 701, a wideband Hidden Markov Model (HMM) 804 is trained in the cepstral domain by an initial HMM trainer 802 using only wideband data 800. In some embodiments, the initial wideband HMM is a small model such as a monophone model with a single Gaussian per state. Such training involves an EM algorithm in which state posterior probability statistics are collected during the E step and model parameters for each Gaussian in each state are updated during the M step.

In step 702, wideband data 800 is used by a Gaussian Mixture Model trainer 806 to train a wideband Gaussian mixture model (GMM) 808. Such training is described above with reference to equations 13 and 14, in which an EM algorithm is used to train a mean $v_k$ and a covariance $\Phi_k$ for each mixture component as well as a prior probability for each mixture component.

At step 704, wideband GMM 808 and narrowband spectral data 810 are used by a cepstral posterior trainer 812 to train cepstral posterior models 814 for each narrowband feature vector. Step 704 involves converting the cepstral wideband GMM model parameters 808 into the spectral domain using equations 8 and 9 above. The spectral domain model parameters are then used to determine $\mu_{ik}^{m|o}$, $\Sigma_k^{m|o}$, and $p(k|x_i^o)$ using equations 17-19 above and the spectral version of narrowband data 810. These values are then used in equations 44 and 45 above to determine $E[x^m|x_i^o]$ and $E[x^m x^{m,T}|x_i^o]$, which are then applied to equations 42 and 43 to determine the global cepstral posterior parameters $\hat{z}_i$ and $\Gamma_i$ for each narrowband spectral feature vector i of narrowband data 810.

At step 706, wideband Hidden Markov Model 804 is used to form narrowband Hidden Markov Model 816 through a transform 818. In one particular embodiment, narrowband HMM parameters 816 are formed from wideband HMM parameters 804 by converting wideband HMM parameters 804 to the spectral domain where the observed components of the parameters can be selected using a filter P. The selected components are then converted back to the cepstral domain. In terms of equations:

$$p(k,q)^{nb}=p(k,q)^{wb} \quad \text{EQ. 46}$$

$$v_{kq}^{nb}=DP(C_M^{-1}v_{kq}^{wb}+b) \quad \text{EQ. 47}$$

$$\Phi_{kq}^{nb}=DP(C_M^{-1}\Phi_{kq}^{wb}C_M^{-T}+A)P^T D^T \quad \text{EQ. 48}$$

where P is an $L^o \times L$ matrix, where $L^o$ is the number of observed components, D is a $M \times L^o$ DCT matrix, $p(k,q)^{wb}$ is the prior probability of the state and mixture component in the wideband model, $p(k,q)^{wb}$ is the prior probability of the state and mixture component in the narrowband model, $v_{kq}^{wb}$ is the mean vector for the Gaussians of state k and mixture component q in the wideband model, $\Phi_{kq}^{wb}$ is the mean vector for the Gaussians of state k and mixture component q in the narrowband model, $\Phi_{kq}^{wb}$ is the covariance matrix for the Gaussians of state k and mixture component q in the wideband model, $\Phi_{kq}^{nb}$ is the covariance matrix for the Gaussians of state k and mixture component q in the narrowband model, and b and A are determined as in equations 10 and 11 above using wideband data.

After the wideband HMM parameters have been used to form narrowband HMM parameters, wideband HMM parameters 804 and wideband data 800 are used by a wideband state posterior probability calculator 820 to determine wideband state posterior probabilities 822 at step 708. In particular, the wideband state posterior probabilities are determined using the conventional Baum-Welch algorithm as:

$$\gamma_{ikq}^{wb} = \frac{\alpha_{ik}\beta_{ik}}{\sum_{k'=1}^{K} \alpha_{ik'}\beta_{ik'}} \frac{p(z_i^{wb} | k, q)p(k, q)}{\sum_{q=1}^{Q} p(z_i^{wb} | k, q')p(k, q')} \quad \text{EQ. 49}$$

where $z_i^{wb}$ is the ith wideband cepstral vector, and the probabilities on the right-hand side are determined using wideband HMM 804.

At step 710, a narrowband state posterior probability calculator 824 determines narrowband state posterior probabilities 826 using narrowband HMM 816 and narrowband cepstral data 810 in a similar fashion as:

$$\gamma_{jkq}^{nb} = \frac{\alpha_{jk}\beta_{jk}}{\sum_{k'=1}^{K}\alpha_{jk'}\beta_{jk'}} \frac{p(z_j^{nb}|k,q)p(k,q)}{\sum_{q'=1}^{Q}p(z_j^{nb}|k,q)p(k,q)} \quad \text{EQ. 50}$$

where $z_j^{nb}$ is the jth narrowband cepstral vector, and the probabilities on the right-hand side are determined using narrowband HMM 816.

At step 712, the wideband and narrowband state probabilities 822 and 826, wideband data 800 and cepstral posterior models 814 are used by a wideband HMM trainer 828 to update wideband HMM 804.

In particular, wideband HMM 804 is updated as:

$$p(k,q) = \frac{\sum_{i=1}^{N^{wb}}\gamma_{ikq}^{wb} + \sum_{j=1}^{N^{nb}}\gamma_{jkq}^{nb}}{\sum_{q'=1}^{Q}\sum_{i=1}^{N^{wb}}\gamma_{ikq'}^{wb} + \sum_{q'=1}^{Q}\sum_{j=1}^{N^{nb}}\gamma_{jkq'}^{nb}} \quad \text{EQ. 51}$$

$$v_{kq}^{wb} = \frac{\sum_{i=1}^{N^{wb}}\gamma_{ikq}^{wb}z_i^{wb} + \sum_{j=1}^{N^{nb}}\gamma_{jkq}^{nb}\hat{z}_j}{\sum_{i=1}^{N^{wb}}\gamma_{ikq}^{wb} + \sum_{j=1}^{N^{nb}}\gamma_{jkq}^{nb}} \quad \text{EQ. 52}$$

$$\Phi_{kq}^{wb} = \frac{\sum_{i=1}^{N^{wb}}\gamma_{ikq}^{wb}(z_i^{wb} - v_{kq}^{wb})(z_i^{wb} - v_{kq}^{wb})^T + \sum_{j=1}^{N^{nb}}\gamma_{jkq}^{nb}((\hat{z}_j - v_{kq}^{wb})(\hat{z}_j - v_{kq}^{wb})^T + \Gamma_j)}{\sum_{i=1}^{N^{wb}}\gamma_{ikq}^{wb} + \sum_{j=1}^{N^{nb}}\gamma_{jkq}^{nb}} \quad \text{EQ. 53}$$

where $z_i^{wb}$ represents a wideband cepstral vector, $\hat{z}_j$ represents the mean of the cepstral posterior model for the jth narrowband vector, $\Gamma_j$ represents the covariance of the cepstral posterior model for the jth narrowband vector, $N^{wb}$ represents the number of wideband feature vectors, and $N^{nb}$ represents the number of extended narrowband feature vectors.

As can be seen in equation 53, the variance of the cepstral posterior model $\Gamma_j$ influences the variance $\Phi_{kq}^{wb}$ of the updated wideband HMM. Since the variance $\Gamma_j$ is an indication of the uncertainty in the extended vector $\hat{z}_j$, the inclusion of the variance $\Gamma_j$ in the update equation for $\Phi_{kq}^{wb}$ injects the uncertainty of the extended vector $\hat{z}_j$ into the uncertainty of the wideband HMM.

At step 714, the method of FIG. 7 determines if wideband HMM 804 has converged. If it has not converged, the process repeats steps 706, 708, 710, and 712 to generate new statistics and to further update the wideband HMM parameters. When the wideband HMM parameters have converged, the process ends at step 716.

Thus, through the present invention, acoustic models may be trained in the cepstral domain using a combination of wideband training data and narrowband training data. Under some embodiments, the narrowband data is used directly in the EM algorithm with the missing components of the narrowband data estimated in the EM iterations. In other embodiments, the narrowband feature vectors are extended by estimating the values of their missing components based on models trained on wideband data only. The extended narrowband feature vectors are then used together with wideband feature vectors to train an acoustic model in the cepstral domain. In further embodiments, the extended narrowband feature vectors are the means of cepstral posterior probabilities and the variances of the cepstral posterior probabilities are also used to train the acoustic model. This allows acoustic models to be trained in the cepstral domain using less expensive narrowband acoustic data thereby making it less expensive to train wideband acoustic models in the cepstral domain while not severely impacting the performance of the acoustic models.

Although the present invention has been described with reference to particular embodiments, workers skilled in the art will recognize that changes may be made in form and detail without departing from the spirit and scope of the invention.

What is claimed is:

1. A computer storage medium having computer-executable instructions stored thereon that when executed by a processor cause the processor to perform steps comprising:
   selecting a wideband set of frequency components of speech signals to form wideband speech data;
   selecting a narrowband set of frequency components of speech signals to form narrowband speech data, the narrowband set of frequency components including at least one of the frequency components of the wideband set of frequency components but having fewer frequency components than the wideband set of frequency components; and
   using the wideband speech data and the narrowband speech data to train a Hidden Markov Model that provides the likelihood of Hidden Markov Model states given speech values.

2. The computer storage medium of claim 1 wherein training a Hidden Markov Model comprises updating model parameters in the spectral domain.

3. The computer storage medium of claim 2 wherein updating model parameters in the spectral domain comprises updating a mean value for frequency components that are not present in the narrowband set of frequency components.

4. The computer storage medium of claim 2 wherein training a Hidden Markov Model further comprises converting the updated model parameters from the spectral domain to a cepstral domain to form cepstral model parameters.

5. The computer storage medium of claim 1 wherein training a Hidden Markov Model comprises determining a mean and variance for a cepstral posterior distribution and using the mean and variance to train the Hidden Markov Model.

6. The computer storage medium of claim 5 wherein using the mean and variance of the cepstral posterior distribution to train the Hidden Markov Model comprises multiplying the mean of the cepstral posterior distribution by a state posterior probability determined from narrowband speech data.

7. The computer storage medium of claim 6 wherein the state posterior probability is further based on a narrowband Hidden Markov Model formed from a wideband Hidden Markov Model.

8. The computer storage medium of claim 6 wherein using the mean and variance of the cepstral posterior distribution to train the Hidden Markov Model further comprises using the variance of the cepstral posterior distribution to determine a variance for a state probability distribution in the Hidden Markov Model.

* * * * *